(12) United States Patent
Vallery

(10) Patent No.: US 7,141,731 B2
(45) Date of Patent: Nov. 28, 2006

(54) MUSIC LEARNING AID

(76) Inventor: Thomas Scott Vallery, P.O. Box 107, Milford, OH (US) 43045

( * ) Notice: Subject to any disclaimer, the term of this patent is extended or adjusted under 35 U.S.C. 154(b) by 20 days.

(21) Appl. No.: 10/890,019

(22) Filed: Jul. 13, 2004

(65) Prior Publication Data

US 2005/0061140 A1 Mar. 24, 2005

Related U.S. Application Data

(60) Provisional application No. 60/504,480, filed on Sep. 19, 2003.

(51) Int. Cl.
*G09B 15/02* (2006.01)
(52) U.S. Cl. .................................. 84/474; 434/404
(58) Field of Classification Search ................ 84/474, 84/465, 470 R, 477 R, 33, 670; 434/308, 434/319, 404
See application file for complete search history.

(56) References Cited

U.S. PATENT DOCUMENTS

| | | | | |
|---|---|---|---|---|
| 3,294,422 A * | 12/1966 | Dragoljub | ..................... | 40/359 |
| 4,069,735 A | 1/1978 | Bertram | | |
| 4,488,720 A * | 12/1984 | Cook | ........................ | 273/239 |
| 4,634,385 A * | 1/1987 | Stemper | ..................... | 434/198 |
| 4,881,443 A | 11/1989 | Bertram | | |
| 4,887,507 A | 12/1989 | Shaw | | |
| 4,920,033 A * | 4/1990 | Cress | ........................ | 434/198 |
| 5,057,067 A * | 10/1991 | Hibsch | ...................... | 493/325 |
| 5,288,234 A * | 2/1994 | Hamzi | ........................ | 434/404 |
| 5,709,552 A * | 1/1998 | LeGrange | ................... | 434/404 |
| 6,031,172 A | 2/2000 | Papadopuulos | | |
| 6,331,668 B1 | 12/2001 | Michero | | |
| 6,841,724 B1 * | 1/2005 | George | ..................... | 84/477 R |
| 2005/0016365 A1 * | 1/2005 | Heslip | ......................... | 84/670 |

* cited by examiner

*Primary Examiner*—Lincoln Donovan
*Assistant Examiner*—Jianchun Qin
(74) *Attorney, Agent, or Firm*—James R. Eley; Michael A. Forhan; Eley Law Firm Co.

(57) ABSTRACT

A music learning aid to assist musicians in learning and using music theory. The music learning aid includes a semicircular folding substrate and two circular and substantially concentric discs having progressively smaller diameters. The substrate and discs are secured together at a central point such the discs are independently rotatable. By rotation and alignment of selected discs the user is able to determine chords, scales and notes associated with musical works. The device allows the user to transpose music from one key to another, as well as transposing chords, scales or intervals.

20 Claims, 4 Drawing Sheets

MUSIC LEARNING AID

This application claims the benefit of provisional patent application 60/504,480, filed Sep. 19, 2003, which is incorporated herein by reference.

FIELD

The present invention relates to a music learning aid. In particular, the present invention relates to a device that can be used to learn basic music theory and easily determine the proper chords, scales keys and notes for musical works. The information thus obtained can be adapted to be specifically applied to any instrument for instruction.

BACKGROUND

Musical sounds may be generally classified in terms of rhythm and pitch. The pitch of a musical sound is determined by the frequency of the sound wave produced by a musical instrument. The difference in pitch between a sound wave having a frequency "f" and a sound wave having a frequency "2f" is termed an "octave".

There are twelve identifiable notes that may be identified using the first seven letters of the alphabet (i.e., "A" through "G"). When these twelve notes repeat themselves in either a higher or lower pitch an octave is reached. For example, if all twelve notes are played in order beginning with the note "C," one complete octave will have been played when either the next higher or next lower "C" note is reached. With reference to Chart 1, the next note after "B" is "C," which is the beginning of the next octave. Thus, a change of one octave is achieved by moving from any one note, up or down, to the next note of the same name (e.g., A to A, B to B, C to C, etc) which is the beginning of the next octave.

The term "octave" (meaning 8 notes) appears to be a misnomer, since an octave actually comprises 12 notes. However, even though there are twelve identifiable notes in an octave, only seven of these twelve "semitones" or half steps are used. These seven notes make up what is termed a musical "key" or "scale". When an individual plays in a musical key using these seven notes, the "eighth" note is an octave above or below one of the seven notes in that key. These musical keys are built upon musical patterns or formulas using a sequence of tones (whole steps) and semitones (half steps).

As mentioned previously, an octave is subdivided into twelve notes called semitones which, when played in succession, comprise a chromatic scale. This is illustrated by Chart 1.

Chart 1

| C | C# | D | D# | E | F | F# | G | G# | A | A# | B |

The difference in pitch, or the interval spanning two semitones, is called a "tone", or whole step, and the sequences of tones and semitones characterize a variety of non-chromatic scales such as the major, harmonic minor and melodic minor scales. The ascending major scale, for example, is characterized by the succession of two tones, one semitone, three more tones and one more semitone. The scale can also be described in terms of two tetra chords of two tones followed by one semitone, wherein the two tetra chords are separated by a tone. The ascending harmonic minor scale, however, is characterized by one tone, one semitone, two more tones, one more semitone, one and a half tones and a final semitone. Each note of the scale is described by a letter A through G and sharps ("#") and flats ("music-flat") are used to describe the semitones that fall between those letters. For example, the interval between A and B is one tone, the semitone above A is A# but can alternatively be described as the semitone below B, or B.music-flat.

Whether a scale will contain certain sharps or flats depends on what the first, "tonic", or base note, of the scale is. For a major scale, the tonic is C and the scale is said to be in the "key of C major." In the key of C major there are no sharps or flats. However, if the tonic is "C sharp", i.e., C# major key, there are seven sharps. If the tonic is "C flat", i.e., C.music-flat. major key, there are seven flats.

It can be very difficult for a student, and sometimes even a music teacher, to determine the correct notes of a certain type of scale in a certain key. It becomes even more difficult to rewrite or "transpose" music that has been written in one key into another key. For example, the ascending "C major" scale is C, D, E, F, G, A, B, C. Transposing it to "D major" is not simply a matter of replacing each note with the next letter in sequence because that will not preserve the sequence of tones and semi-tones that characterize a major scale. That is, D major is not D, E, F, G, A, B, C, D, but rather D, E, F#, G, A, B, C#, D so as to conform to the correct placement of tones' and semitones for major scale construction as described above.

Most beginners in the field of music have difficulty in grasping the fundamental concepts behind the organization of musical scale structures. As a result, the teaching of music can quickly become tedious and frustrating both for the pupil and the teacher. Various types of aids have been devised to help students to better understand music theory. Example teaching aids include charts, tables, graphs, computer programs and slide rules. However, these aids suffer from drawbacks that limit their effectiveness. For example, students can be easily confused and intimidated by the complex array of letters and symbols displayed by the various aids. These devices generally require that the student already possess a detailed knowledge of music theory to be able to use them effectively. In addition, current aids are not easily usable in conjunction with musical instruments, requiring the user to operate either the instrument or the aid, but not both at the same time. This limits the effectiveness of the music aid for such tasks as transposing music. There is a need for a music learning aid that is not intimidating and is easy to use. There is a further need for a music learning aid that is of a convenient size and shape, and can be used in conjunction with a variety of musical instruments. There is still further need to have a music aid that can be employed by the musician concurrently while they are playing their instrument.

SUMMARY

A device is disclosed to assist musicians in learning and using music theory according to an embodiment of the present invention. The device comprises two circular and substantially concentric discs having progressively smaller diameters and one semicircular folding substrate. The discs are secured to the substrate at a central point such the discs are independently rotatable. By rotation and alignment of selected discs the user is able to determine chords, scales and notes associated with musical works. The present invention allows the user to easily transpose music from one key to another, as well as to transpose chords, scales or intervals.

One object of the present invention is to provide a music learning aid comprising a substrate, an outer disc and an inner disc wherein the outer disc and inner disc are rotatably coupled to the substrate. At least one of the outer disc, inner disc and substrate display visual information relating to music.

Another object of the present invention is to provide a method for assembling a music learning aid, comprising the steps of obtaining a substrate, arranging an outer disc over the substrate, arranging an inner disc over the outer disc, and fastening together the, substrate, outer disc and inner disc such that the outer disc and inner disc are independently rotatable. At least one of the outer disc, inner disc and substrate display visual information relating to music.

Still another object of the invention is to provide a method of using a music learning aid, comprising the steps of reading instructions on a substrate, rotating an outer disc, and rotating an inner disc, wherein at least one of the outer disc, inner disc and substrate display visual information relating to music.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
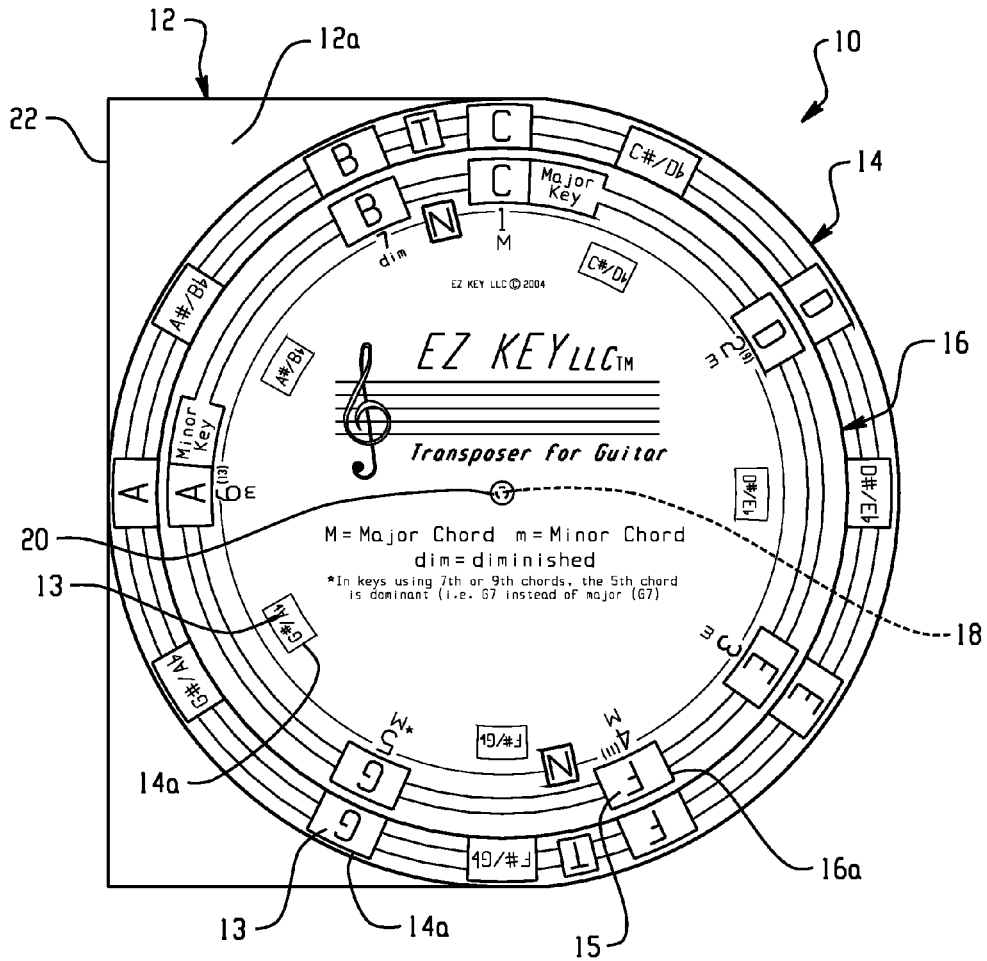
FIG. 1 is a plan view of a first outside plane of a music learning aid according to an embodiment of the present invention.
Figure 3:
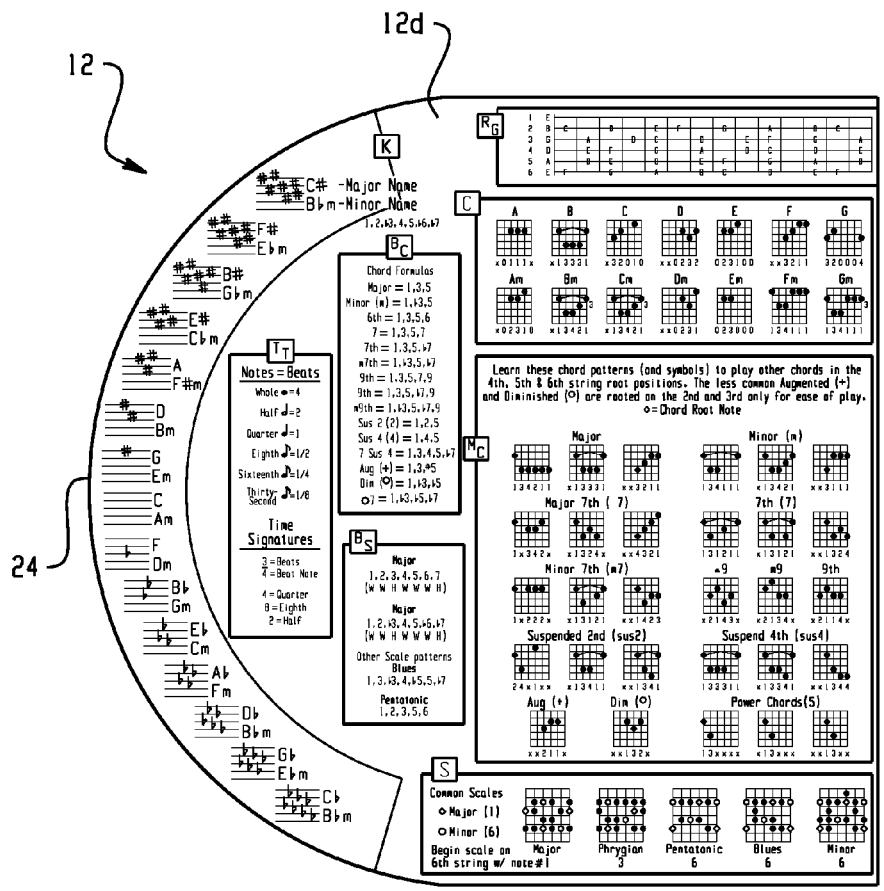
FIG. 3 is a rear view of a second outside plane of the music learning aid of FIG. 1.

A music learning aid 10 according to an embodiment of the present invention is shown in FIG. 1. Music learning aid 10 comprises a generally planar, "D shaped" substrate 12, a generally planar circular outer disc 14 and a generally planar, circular inner disc 16. For the purpose of this disclosure, "D shaped" is defined generally as the shape of an extended semi-circle as shown in FIG. 3. Although a circular shape is preferred for discs 14, 16, it should be noted that any desired geometric shape may be utilized including, without limitation, polygonal shapes. Substrate 12 and discs 14, 16 may be made of any conventional material including, without limitation, paper, cardboard, plastic, metal or composites. Discs 12, 14, 16 may be of a matching or contrasting background colors, though a high-contrast color such as white is preferred for enhancing the viewability of text and graphics imprinted thereon. An opening 18 is located at or proximate the geometric center of each disc 14, 16 and at a predetermined location of substrate 12, as will be discussed further below.

Figure 2:
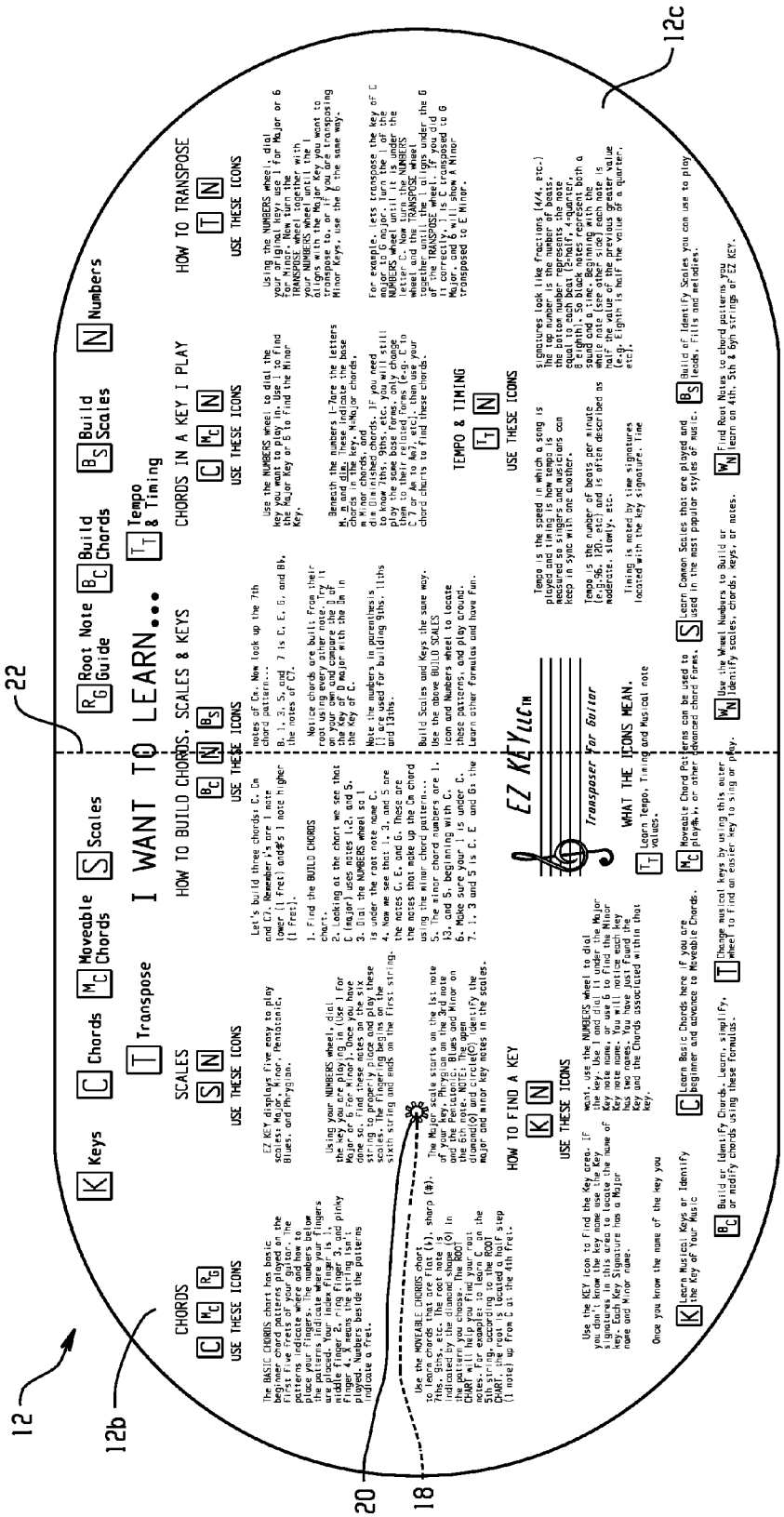
FIG. 2 is a plan view of first and second inside planes of the music learning aid of FIG. 1 when it is opened.

With reference to FIGS. 1 and 2, substrate 12 is scored, folded or hingedly bound at 22 to form a first outer surface 12a, shown in FIG. 1, and first and second inner surfaces 12b and 12c, respectively, shown in FIG. 2. A second outer surface 12d, shown in FIG. 3, folds open and away from first outer surface 12a so it may be perceived simultaneously with the first outer surface and discs 14, 16. First outer surface 12a preferably contains visually perceptible legends and markings, as at 13, which are associated with music theory and are spaced to be visible through a plurality of openings or windows 14a (see FIG. 1). Second outer surface 12d contains visually perceptible information and operating instructions for using music learning aid 10.

With additional reference to FIG. 3, surface 12d displays music theory information and patterns that correspond to displayed musical legends and markings, as at 13, and on discs 14, 16. Markings 13 on first outer surface 12a are arranged to be visible when substrate 12 is assembled to outer and inner discs 14, 16 respectively. Outer disc 14 (shown in FIG. 1) similarly displays legends and markings associated with music theory, the legends and markings being printed on one side of the outer disc and arranged to be visible when the outer disc is assembled between substrate 12 and inner disc 16. The term "outer" when referring to disc 14 means the disc has the larger diameter and extends further out than the other(s) and does not refer to the planar arrangement of the discs. Inner disc 16 likewise displays markings and legends associated with music theory, the markings and legends being located on one side of the inner disc and arranged to be visible when inner disc 16 is assembled to substrate 12 and outer disc 14. Inner disc 16 may further include operating instructions on its outwardly facing side, as shown in FIG. 1. Inner disc 16, like outer disc 14, includes a plurality of openings or windows 16a that allow pertinent music notational information 15 displayed on outer disc 14 to be viewed under certain positional conditions. Windows 14a, 16a are logically arranged to allow only predetermined portions of music theory information to be viewed.

Figure 4:
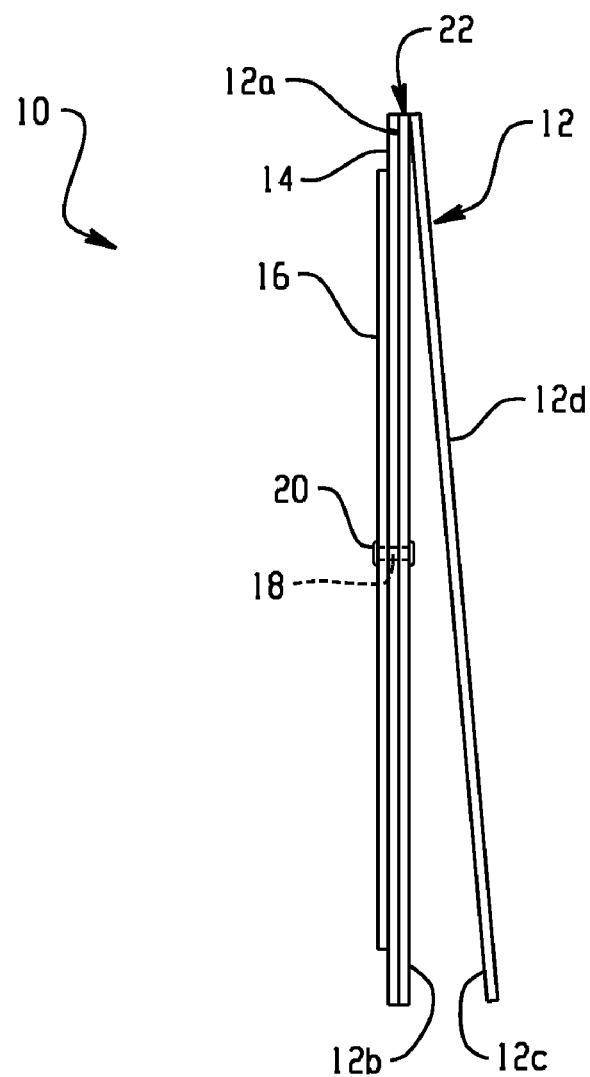
FIG. 4 is a side elevational view of the music learning aid of FIG. 1.

Music learning aid 10 is assembled by positioning outer disc 14 atop first outer surface 12a of substrate 12 such that the surface displaying the musical notation is facing outward, as shown in FIG. 1. Inner disc 16 is, in turn, positioned atop outer disc 14 such that the surface displaying the musical notation is facing outward. Central openings 18 of substrate 12 and discs 14, 16 are aligned with one another, and then rotatably joined with a fastening means 20 placed through the openings, forming a common axis for each of the discs to rotate. Fastening means 20 may include, without limitation, a rivet, stake, connector, prongs, screw, and pin. Fastening means 20 preferably is binding enough to prevent substrate 12 and discs 14, 16 from separating from one another, yet allows each disc to be independently rotated about their common axis. As shown in FIGS. 1 and 4, the completed assembly 10 comprises substrate 12 and discs 14, 16 in an aligned, rotatably joined arrangement.

Music learning aid 10 may be used to determine the proper chords, scales and musical notes properly associated with a musical work, as detailed in the examples below.

One function of the present invention is to determine the proper chords, scales and musical notes properly associated with a musical key for any given piece of music. If a piece of music is composed in the key of "C," for example, a user may desire to either play this piece of music individually or with others in a group.

If the user knows what key they will be playing, they can continue to the next step, discussed below. However, if the user desires to play a piece of music with a key signature but cannot identify the key signature with regard to identifying and using the proper chords and scales, they can open substrate 12 to view surfaces 112b, 12c (see FIG. 2) and learn how to identify a musical key, and use surface 12d (see FIG. 3) to identify which key signature is associated with what key letter name. Once the user has read the instructions contained on surfaces 12*b*, 12*c* and 12*d* relating to how to find a key, color-coded icons positioned proximate those instructions assist the user in locating, identifying and using that information. Along a generally semi-circular edge 24 of surface 12*d* are fifteen key signatures with their appropriate sharps and flats identified by a color-coded icon from the instructions, and letter names identifying each key signature. Along with the color coded icons are identifying colors that outline and surround the necessary information. Once the user has identified the proper letter name for a particular key signature, they can continue to the next step, discussed in detail below.

After determining the key, the user may then continue reading instructions imprinted on substrate surfaces 12*b*, 12*c* (see FIG. 2). Continuing in the earlier example of the key of "C," the user may observe that the number "1" on inner disc 16, which is identified also by its own color coded icon, may be rotated, or "dialed", to align beneath a letter name on outer disc 14 to identify the root note name of a key. This letter name is identifiable by the use of markings and surface 16 windows 16*a* that allow only relevant information to be viewed. In the present example, the user would position the number "1" of inner disc 16 beneath the letter "C" on outer disc 14 to identify the key of "C" major.

By dialing the number "1" beneath the letter name "C," inner disc 16 displays the following information to the user:

(a) letter "C" is the identifying note of a major key, as noted by the phrase "Major Key" printed and highlighted to right of the letter name. Likewise, the number "6" printed on inner disc 16 is used to identify the "Minor Key" in the same manner.

(b) letter "C" is also a name of a chord played in this key, and each number thereafter (i.e., 2–7) also identifies and represents a note or chord played in that same key. The user identifies these chords by looking beneath the number(s) printed on inner disc 16, identifying the root chords of this key using either Major Chord (M), Minor Chord (m), or Diminished Chord (dim). Inner disc 16 displays a key that indicates to the user the meanings of each of these identifiers. In the present example, each letter identified with the numbers 1–7 are also either identified as either M, m, or dim. The user is thus able to identify which root chords are played in the key of "C" at this point.

(c) when dialing "1" for a Major key and its associated chords, the number 6 simultaneously identifies a Minor Key, which contains the same root chords and notes. This also indicates that these keys are relative (or relate to one another) because they have the same notes, chords, and scales in common and can be used with one another. This is one way in which to identify what music commonly identifies as "Relative Minor" and "Relative Major" keys. In the present example, the key of "C" major (number 1) has a relative minor key identified as A minor (number 6), and everything associated with either of these keys can be used in conjunction with one another.

(d) in the area of common scales, displayed by surface 12*d* (see FIG. 3) and identified by a color coded icon using the letter "S," there are common scales that a guitarist may use, for example, in playing melodies, fills, or solos over the root chords of this particular key. There may also be information that indicates to the user where and what notes are used in playing these scales.

(e) the numbers 1–7 can be used to help the user learn and identify what notes are used in a particular chord, scale, or key, and how to build chords, scales and keys by using the formulas displayed on surface 12*d* of substrate 12.

These portions and instructions are all identified by color-coded icons displayed on surfaces 12*b*, 12*c* and 12*d*.

Once the user has identified the chords in which to play for a key (in the present example the key of C), or learned that they have the option of using a particular key, they can either unfold surfaces 12*a* and 12*d* about hinge 22 so both surfaces face upwardly generally toward the user while lying on a relatively flat surface such as a table. In the alternative, the user may choose to keep substrate 12 folded closed and turn music learning aid 10 over and view surface 12*d* of the substrate to identify the displayed chords and use the patterns to learn how to play these chords. There are common major and minor chord patterns displayed proximate a circular portion of surface 12*d* to which a user may refer. Alternatively, the user has the option of either using "moveable chord patterns" of these root chords listed below the common patterns or the relative forms of these chords (i.e., m7, m9, Aug, etc.).

After the user has identified the key in which they are playing, and the chords and scales associated with a particular composition, they may find that this key is outside their, or another's, singing ability or range. Now the user must "transpose," or change, all the chords and scales to another key in which the composition can be sung. To accomplish this the user may refer to instructions displayed on surfaces 12*b*, 12*c* describing the steps to transpose music into a different key. These instructions may further include color-coded graphical images or icons that will assist the user in identifying all the necessary areas used to accomplish the transposing of this key. The user learns from the instructions and identifying color coded icons to keep the number "1" beneath the original key (as in the present example the key of "C") and then turn inner disc 16 together with outer disc 14 to transpose to another key that will better fit the voice for a particular composition using information displayed on surface 12*a*. There are openings or windows 14*a* in disc surface 14 which allow the information essential to the new key to be viewed from surface 12*a* for proper key transposing. If the composition is easier to sing in the key of "G," for example, then the "G" displayed on surface 12*a* of substrate 12 is dialed so it is visible through window 14*a* of surface 14 above the number "1" of surface 16 and the letter "C" is visible through the window 16*a* above the number "1" of surface 16. Once this is done, all of the above information is interpreted in the same way in conjunction with inner disc 16. This indicates to the user that, in this particular composition, every C transposes to a G, every D transposes to an A, every E to a B, and so on. If properly performed according to the displayed instructions, the number "1" of inner disc 16 will be aligned beneath the "C" displayed on outer disc 14 (whose printing is visible through window 16*a*) above the number "1," and the "G" printed on surface 12*a* will be viewable through window 14*a* of the outer disc above the "C" of the outer disc. The scales then become associated to the new key(s) of either G major and E minor (these are relatives of one another) and the user can interpret that information accordingly.

Over time the user may want to learn the basis of music theory, i.e., how and why chords and scales are associated with the keys in which they are played. The numbers displayed on inner disc 16 can be used in conjunction with numerical formulas displayed on surface 12*d* of substrate 12 (see FIG. 3) to identify and build scales and chords according to keys in which they are used. Once again, there are instructions displayed on surfaces 12*b*, 12*c* relating to how to build chords, scales and keys as well as color-coded icons to assist the user in identifying areas pertaining to these instructions. The user need only choose the letter name of a chord or scale on the outer disc 14, and dial it through window 16*a* of inner disc 16 above number "1" to establish the root note or name of a chord or scale. Formulae displayed on surface 12*d* inform the user as to what other notes, identified with the other numbers (i.e., 2–7), are associated with their chosen chord or scale.

In an alternate embodiment of the present invention, substrate 12 may be made detachable such that it may be removed from music aid 10 once the instructional information on the substrate has been learned. Similarly, substrate 12 may be a circular or disc shape of a greater diameter than discs 14, 16 and attached permanently to the discs while an instructional portion of substrate 12 may be made detachable from music aid 10.

In another alternate embodiment of the present invention, an "easel" or similar support (not shown) may be fabricated from plastic or other suitable materials and coupled to fastening means 20 (see FIGS. 1–4) or at least one of substrate 12, outer disc 14 and inner disc 16, allowing music learning aid 10 to stand upright so as to be visually perceived and used in a more user-friendly fashion. The easel may be fabricated by any conventional process including, without limitation, machining, casting and injection molding.

In yet another alternate embodiment of the present invention, music learning aid 10 can be simplified to display only that relevant information which is user specific. For example, a novice student may not need to know or have a sufficient understanding of music theory information as it relates to building chords, scales and keys. Non-pertinent information may be hidden or otherwise not displayed on substrate 12 and discs 14, 16.

In still another alternate embodiment of the present invention, an electronic equivalent of music learning aid 10 may be used in conjunction with, or independently of, the music learning aid. For example, substrate 12, outer disc 14 and inner disc 16 may be displayed interactively on a computer and manipulated using a predetermined set of instructions, such as a computer program (not shown).

In yet another alternate embodiment of the present invention, an interactive set of instructions such as a computer program may be stored and presented in any conventional form, such as a booklet, book, manual, video cassette, audio cassette, CD ROM or DVD that may be packaged with or attached to music learning aid 10 to allow for audio and/or visual instruction on the use of the music learning aid.

One skilled in the art will recognize that any assortment of materials and/or colors can be used in association with any of the foregoing embodiments of the present invention to assist in the making and use of music learning aid 10. Any predetermined selection and combination of colors may be used to both identify and instruct the user on how to use music learning aid 10 by incorporating predetermined colors and icons for quick reference and ease of understanding.

While this invention has been shown and described with respect to a detailed embodiment thereof, it will be understood by those skilled in the art that changes in form and detail thereof may be made without departing from the scope of the claims of the invention. For example, the manner of displaying instructional information, keys, chords, scales, musical notes, transposition information, colors, and icons may be changed in form, detail and arrangement without departing from the scope of the claimed invention

What is claimed is:

1. A music learning aid, comprising:
   a substrate having a first portion and a second portion, the second portion being hingedly coupled to the first portion, the substrate being selectably operable between open and closed conditions;
   an outer disc positioned atop an outer surface of the first portion of the substrate and rotatably coupled thereto;
   an inner disc positioned atop the outer disc and rotatably coupled to at least one of the outer disc and the substrate; and
   at least one of instructions, information and formulae disposed upon at least one of the substrate, outer disc and inner disc,
   wherein at least one of the outer disc and inner disc are rotatable regardless of the closure condition of the substrate.

2. The music learning aid of claim 1 wherein the first and second portions of the substrate are formed by a bisecting score line.

3. The music learning aid of claim 1 wherein at least one of the substrate, outer disc and inner disc are made from plastic.

4. The music learning aid of claim 1 wherein the outer disc and inner disc are rotatably coupled to the substrate with fastening means.

5. The music learning aid of claim 1 wherein at least one of the information, instructions and formulae relate to at least one of chords, scales, and musical notes associated with a musical key.

6. The music learning aid of claim 1 wherein at least one of the outer disc, inner disc and substrate further includes at least one window for displaying information relating to music within the window.

7. The music learning aid of claim 1 wherein at least one of the substrate, outer disc and inner disc further includes at least one of color-coded information, instructions, formulae and icons.

8. The music learning aid of claim 1 wherein the substrate further comprises:
   a third disc rotatably coupled to the outer disc and inner disc;
   an instructional portion detachably coupled to the third disc; and
   at least one of instructions, formulae and icons disposed upon the third disc.

9. The music learning aid of claim 1, further comprising an easel operatively coupled to at least one of the substrate, outer disc and inner disc.

10. The music learning aid of claim 1 wherein at least one of the substrate, outer disc and inner disc display at least one of information, instructions and formulae pertinent to specific user needs.

11. The music learning aid of claim 1 wherein the substrate, outer disc and inner disc are displayed in electronic form.

12. The music learning aid of claim 11, further comprising an interactive computer program.

13. A music learning aid, comprising:
   a substrate having a first portion and a second portion, the second portion being hingedly coupled to the first portion, the substrate being selectably operable between open and closed conditions;
   an outer disc positioned atop an outer surface of the first portion of the substrate and rotatably coupled thereto, the outer disc having a plurality of windows;
   an inner disc positioned atop the outer disc and rotatably coupled to at least one of the outer disc and the substrate, the inner disc having a plurality of windows;

at least one of instructions, information and formulae disposed upon at least one of the substrate, outer disc and inner disc; and a plurality of icons disposed upon at least one of the substrate, outer disc and inner disc, wherein related information, instructions and formulae are logically linked together by the icons, and wherein at least one of the outer disc and inner disc are rotatable regardless of the closure condition of the substrate.

14. A method for assembling a music learning aid, comprising the steps of:

obtaining a substrate having a first portion and a second portion, the second portion being hingedly coupled to the first portion, the substrate being selectably operable between open and closed conditions;

obtaining an outer disc and an inner disc;

disposing at least one of instructions, information and formulae upon at least one of the substrate, outer disc and inner disc;

arranging the outer disc atop the first portion of the substrate;

arranging the inner disc atop the outer disc; and fastening together the substrate, outer disc and inner disc such that the outer disc and inner disc are independently rotatable regardless of the closure condition of the substrate.

15. The method of claim 14, further comprising the step of forming the first and second portions of the substrate with a bisecting score line.

16. The method of claim 14 wherein at least one of the information, instructions and formulae relate to at least one of chords, scales, and musical notes associated with a musical key.

17. The method of claim 14, further comprising the step of providing at least one window to at least one of the outer disc, inner disc and substrate.

18. A method of using a music learning aid, comprising the steps of:

reading at least one of instructions, information and formulae disposed upon hingedly coupled first and second portions of a substrate of the music learning aid, the substrate being selectably operable between open and closed conditions;

rotating an outer disc of the music learning aid, the outer disc being positioned atop the first portion of the substrate and rotatable regardless of the closure condition of the substrate; and rotating an inner disc of the music learning aid the inner disc being positioned atop the outer disc and rotatable regardless of the closure condition of the substrate, wherein at least one of the outer disc, inner disc and substrate provides the user with information relating to music.

19. The method of claim 18, wherein at least one of the information, instructions and formulae relate to at least one of chords, scales, and musical notes associated with a musical key.

20. The method of claim 18, wherein at least one of the information, instructions and formulae relate to transposing chords and scales from a first key to a second key.

* * * * *